United States Patent
Brown et al.

(10) Patent No.: US 9,541,132 B2
(45) Date of Patent: Jan. 10, 2017

(54) SNAP-FIT BOX CAGE ASSEMBLY

(71) Applicant: Schaeffler Technologies AG & Co. KG, Herzogenaurach (DE)

(72) Inventors: James Kevin Brown, Rock Hill, SC (US); Neil Hoan, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/706,115

(22) Filed: May 7, 2015

(65) Prior Publication Data

US 2015/0330448 A1    Nov. 19, 2015

Related U.S. Application Data

(60) Provisional application No. 62/000,196, filed on May 19, 2014.

(51) Int. Cl.

| F16C 33/46 | (2006.01) |
|---|---|
| F16C 43/08 | (2006.01) |
| F16C 33/54 | (2006.01) |
| F16C 19/30 | (2006.01) |

(52) U.S. Cl.
CPC ........... *F16C 33/547* (2013.01); *F16C 19/305* (2013.01); *Y10T 29/49687* (2015.01)

(58) Field of Classification Search
CPC .............................. F16C 33/547; F16C 19/305
USPC ............. 384/620, 623; 29/898.041, 898.064
See application file for complete search history.

(56) References Cited

U.S. PATENT DOCUMENTS

| 3,090,109 A | 5/1963 | Carullo et al. |
| 3,644,007 A | 2/1972 | Alling |
| 3,913,994 A | 10/1975 | Alling et al. |
| 3,994,546 A | 11/1976 | Alling |
| 4,225,200 A | 9/1980 | Dougall |
| 6,520,685 B1 | 2/2003 | Urmaza |
| 7,104,699 B2 * | 9/2006 | Shattuck ................. F16C 19/30 |
| | | 384/455 |
| 7,707,723 B2 | 5/2010 | Tamada et al. |
| 7,927,022 B2 | 4/2011 | Kadokawa et al. |

(Continued)

FOREIGN PATENT DOCUMENTS

| FR | 1281684 A | 1/1962 |
| GB | 913144 A | 12/1962 |

(Continued)

*Primary Examiner* — Phillip A Johnson
(74) *Attorney, Agent, or Firm* — Volpe and Koenig, P.C.

(57) ABSTRACT

A snap-fit box cage including a first and second ring is provided. The first ring includes a first radially outer flange, a first radially inner flange, and a first radial portion extending therebetween. At least one of the first radially inner flange or the first radially outer flange includes at least one retention projection. The second ring includes a second radially outer flange, a second radially inner flange, and a second radial portion extending therebetween. At least one of the second radially inner flange or the second radially outer flange includes at least one retention recess that is complementary to the retention projection. The first and second rings are matingly secured to one another by the at least one retention projection and the at least one retention recess resiliently engaging with each other, and the rings captively secure rollers installed in pockets formed on the rings.

11 Claims, 13 Drawing Sheets

(56) References Cited

U.S. PATENT DOCUMENTS 8,414,195 B2 * 4/2013 Brown .................. F16C 41/045
                                                            384/618

FOREIGN PATENT DOCUMENTS

GB          2337797 A      12/1999
JP       2007205521 A  *    8/2007

* cited by examiner

SNAP-FIT BOX CAGE ASSEMBLY

INCORPORATION BY REFERENCE

The following documents are incorporated herein by reference as if fully set forth: U.S. Provisional Patent Application No. 62/000,196, filed May 19, 2014.

FIELD OF INVENTION

The present invention relates to a rolling element assembly and in particular to a snap-fit box cage for a rolling element assembly.

BACKGROUND

Cages are used in rolling element assemblies to provide circumferential support and guidance for the rolling elements in order to allow pre-assembly and for ease of installation in a bearing assembly. Box cages include two cage rings that are assembled together via a retention element to captively secure rolling elements between the two cage rings. Known box cages are shown in U.S. Pat. No. 7,927,022 and U.S. Pat. No. 7,707,723. Known box cages require at least one of the two cage rings to include a radially bent flange for securing the two cage rings to one another. Bending the flange to form a retention element for the two cage rings adds an additional step to the assembly process and increases the time required to assemble the cage. It would be desirable to eliminate this additional step by providing an alternative retention element capable of providing a reliable mating connection between the two cage rings of a box cage assembly.

SUMMARY

Briefly stated, a snap-fit box cage is provided. The snap-fit box cage includes a first ring including a first radially outer flange, a first radially inner flange, and a first radial portion extending therebetween. The first radial portion includes a first plurality of circumferentially spaced apart pockets for rolling elements. At least one of the first radially inner flange or the first radially outer flange includes at least one retention projection. The snap-fit box cage includes a second ring including a second radially outer flange, a second radially inner flange, and a second radial portion extending therebetween. The second radial portion includes a second plurality of circumferentially spaced apart pockets for rolling elements. At least one of the second radially inner flange or the second radially outer flange includes at least one retention recess that is complementary to the at least one retention projection of the first ring. During assembly, the first ring and second ring are pressed together such that the first and second radially inner flanges engage one another, the first and second radially outer flanges engage one another, and the at least one retention projection of the first ring is resiliently engaged within the at least one retention recess of the second ring.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figures 1A, 1B:
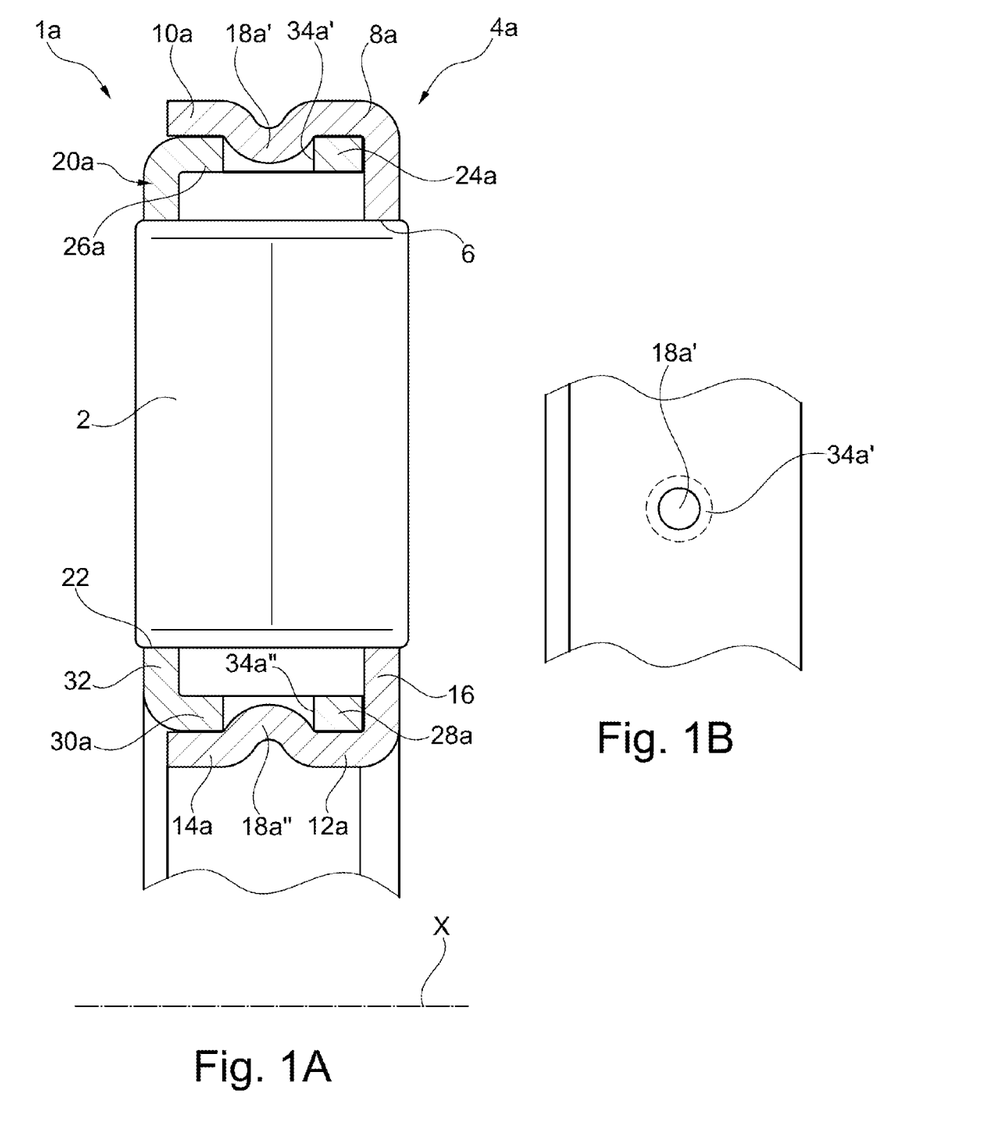
FIG. 1A is a cross-sectional view through a snap-fit box cage for a rolling bearing assembly according to the present invention.
FIG. 1B is a partial top view of the snap-fit box cage of FIG. 1A.

Referring to FIGS. 1A and 1B, a snap-fit box cage 1a for rolling elements 2 of a rolling bearing assembly according to a first embodiment of the present invention is shown. The rolling elements 2 are preferably cylindrical rollers. The rolling elements 2 are captively held between a first ring 4a and a second ring 20a, and are guided to roll on races on an inner ring, outer ring, or housing (not shown) via pockets 6, 22 formed on a respective one of the first and second rings 4a, 20a.

In the first embodiment of the snap-fix box cage 1a, shown in FIGS. 1A and 1B, the first ring 4a includes a first radially outer flange 8a and a first radially inner flange 12a that both extend in the same axial direction. A first radial portion 16 of the first ring 4a extends between the first radially outer flange 8a and the first radially inner flange 12a. The first radial portion 16 includes a first plurality of circumferentially spaced apart pockets 6 for supporting the rolling elements 2. Similar to the first ring 4a, the second ring 20a includes a second radially outer flange 24a and a second radially inner flange 28a, with a second radial portion 32 that extends therebetween. The second ring 20a also includes a second plurality of circumferentially spaced apart pockets 22 on the radial portion 32 for supporting the rolling elements 2. In the first embodiment, the first radially outer flange 8a encompasses the second radially outer flange 24a, and the first radially inner flange 12a encompasses the second radially inner flange 28a, such that the second ring 20a is nested within the first ring 4a.

As shown in FIG. 1A, the first radially outer flange 8a includes at least one retention projection 18a' that projects radially inwardly. As shown in FIG. 1A, the at least one retention projection 18a' is formed as a dome-shaped projection. One of ordinary skill in the art recognizes other shapes could be used for retention projections 18, such as a D-shaped projection having a straight edge surface, which is shown in the other embodiments. The second ring 20a includes at least one retention recess 34a' on the second radially outer flange 24a. The at least one retention projection 18a' and the at least one retention recess 34a' are complementary to one another and once engaged with each other, they captively secure the first ring 4a with the second ring 20a. In the embodiment shown in FIG. 1A the at least one retention recess 34a' is formed as a circular hole. One of ordinary skill in the art recognizes other shapes could be used for retention recesses 34, such as an indentation, or D-shaped hole, which are shown in the other embodiments. The first radially inner flange 12a preferably includes at least one retention projection 18a" that projects radially outwardly. In the first embodiment, the retention projections 18a', 18a" project radially towards each other. The second radially inner flange 28a includes at least one retention recess 34a". As shown in FIGS. 1A and 1B, the retention projections 18a', 18a" are located at a medial portion 10a, 14a of the first radially outer flange 8a and the first radially inner flange 12a. The retention recesses 34a', 34a" are also located at a medial portion 26a of the second radially outer flange 24a and a medial portion 30a of the second radially inner flange 28a of the second ring 20a. FIG. 1B is a partial top view of the snap-fit box cage 1a showing the at least one retention projection 18a' and the at least one retention recess 34a' in broken lines.

Preferably, each of the rings 4, 20 of the snap-fit box cage 1 is formed from sheet metal, and the forming of the retention projections 18 and retention recesses 34 comprises punching or bending the flanges of the first and second rings 4, 20.

Figure 2:
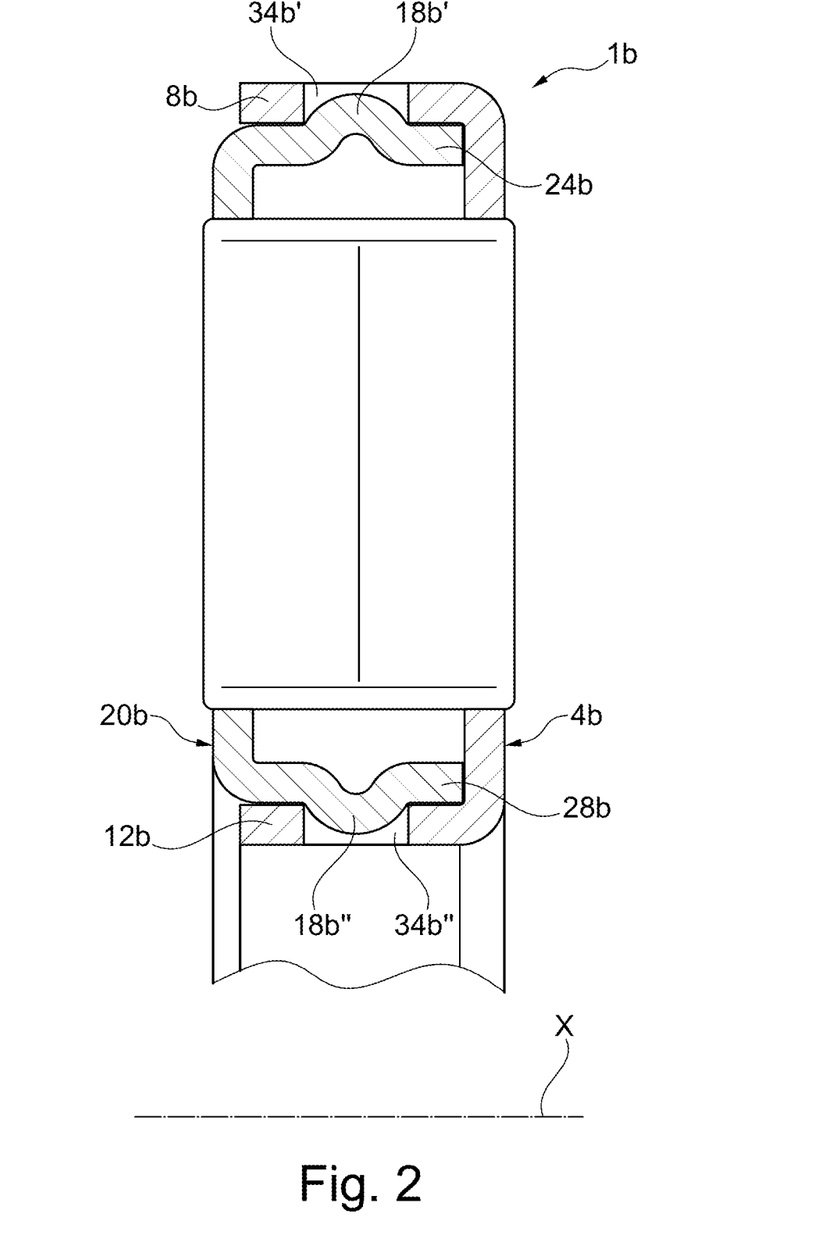
FIG. 2 is a cross-sectional view through a snap-fit box cage according to a second embodiment of the present invention.

Referring to FIG. 2, a second embodiment of a snap-fit box cage 1b according to the invention is shown. The snap-fit box cage 1b according to the second embodiment is similar to the first embodiment, except that the first ring 4b includes retention recesses 34b', 34b", and the second ring 20b includes retention projections 18b', 18b" that project radially away from each other into the recesses 34b', 34b". In this embodiment, the first radially outer flange 8b encompasses the second radially outer flange 24b, and the first radially inner flange 12b encompasses the second radially inner flange 28b.

Figure 3:
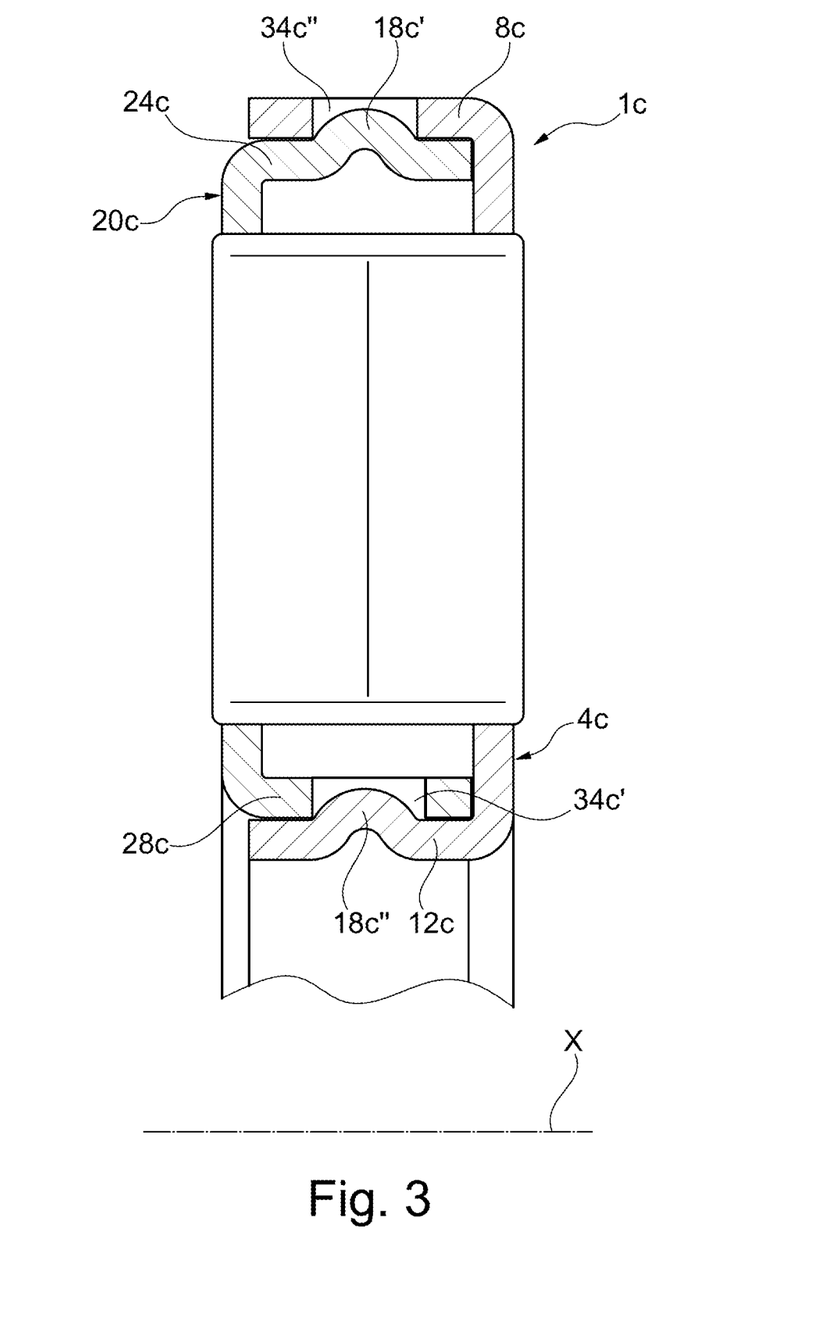
FIG. 3 is a cross-sectional view through a snap-fit box cage according to a third embodiment of the present invention.

Referring to FIG. 3, a third embodiment of a snap-fit box cage 1c according to the invention is shown. The snap-fit box cage 1c according to the third embodiment is similar to the first embodiment, except that the first ring 4c includes at least one retention projection 18c" on the first radially inner flange 12c that projects radially outwardly, and the first ring 4c includes at least one retention recess 34c" on the first radially outer flange 8c. The second ring 20c includes at least one retention recess 34c' on the second radially inner flange 28c, and the second ring 20c includes at least one retention projection 18c' on the second radially outer flange 24c that projects radially outwardly. The at least one retention projection 18c' on the second radially outer flange 24c engages with the at least one retention recess 34c" on the first radially outer flange 8c. The at least one retention projection 18c" on the first radially inner flange 12c engages with the at least one retention recess 34c' on the second radially inner flange 28c. The first radially outer flange 8c encompasses the second radially outer flange 24c, and the first radially inner flange 12c encompasses the second radially inner flange 28c.

Figure 4:
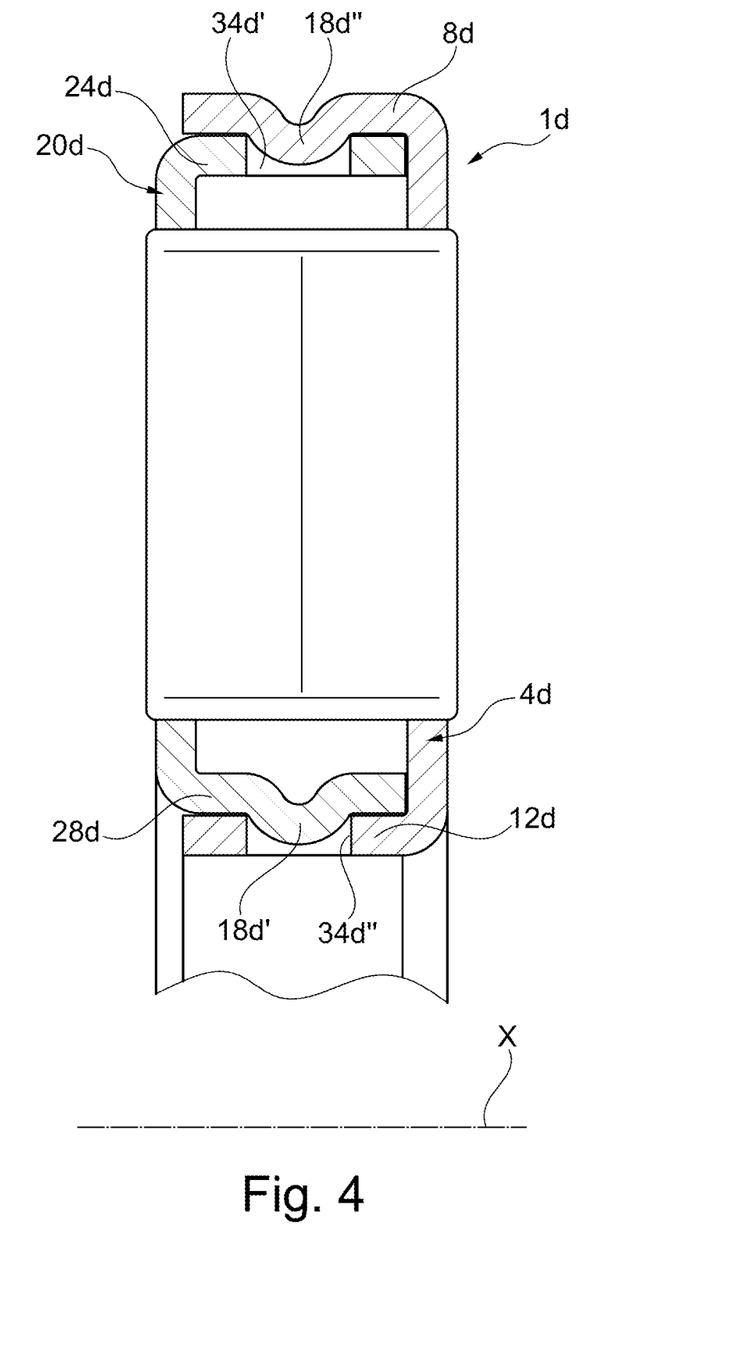
FIG. 4 is a cross-sectional view through snap-fit box cage according to a fourth embodiment of the present invention.

Referring to FIG. 4, a fourth embodiment of a snap-fit box cage 1d according to the invention is shown. The snap-fit box cage 1d according to the fourth embodiment is similar to the first embodiment, except that the second ring 20d includes at least one retention projection 18d' on the second radially inner flange 28d that projects radially inwardly, and includes at least one retention recess 34d' on the second radially outer flange 24d. The first ring 4d includes at least one retention recess 34d" on the first radially inner flange 12d, and includes at least one retention projection 18d" on the first radially outer flange 8d that projects radially inwardly. The at least one retention projection 18d' on the second radially inner flange 28d engages with the at least one retention recess 34d" on the first radially inner flange 12d. The at least one retention projection 18d" on the first radially outer flange 8d engages with the at least one retention recess 34d' on the second radially outer flange 24d. The first radially outer flange 8d encompasses the second radially outer flange 24d, and the first radially inner flange 12d encompasses the second radially inner flange 28d.

Figure 5:
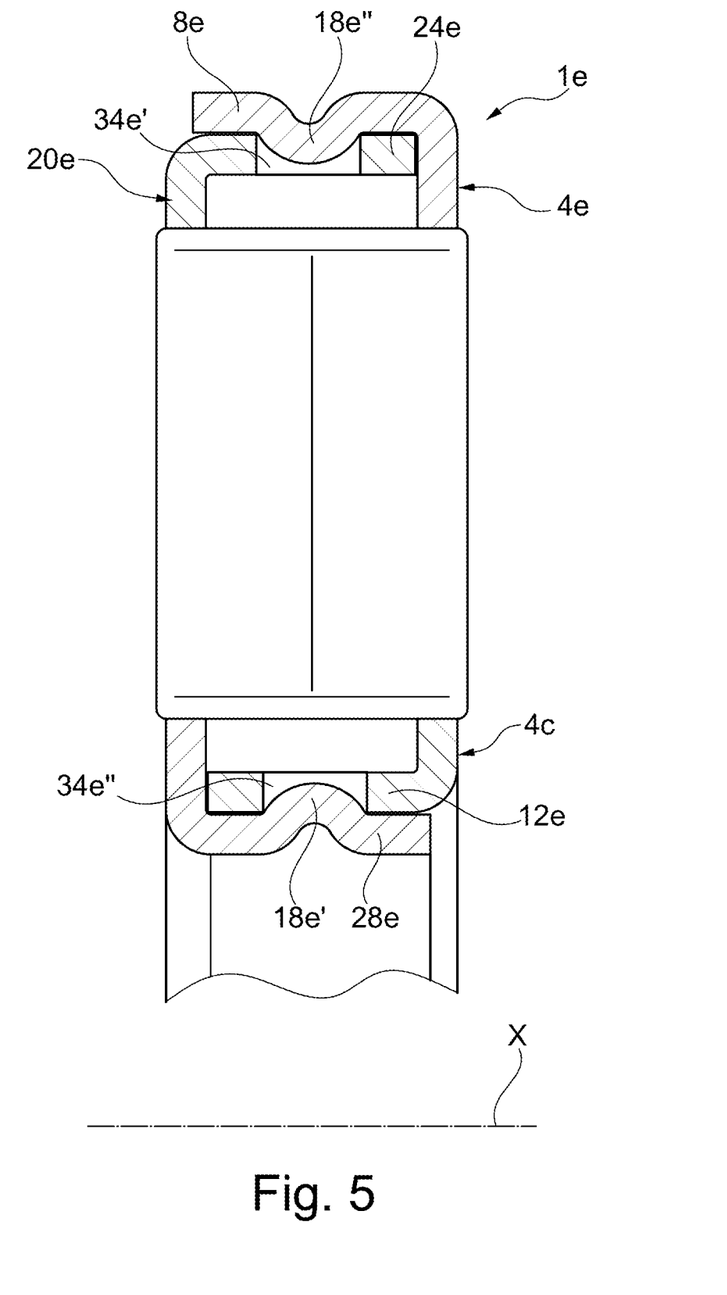
FIG. 5 is a cross-sectional view through a snap-fit box cage according to a fifth embodiment of the present invention.

Referring to FIG. 5, a fifth embodiment of a cage 1e according to the invention is shown. The snap-fit box cage 1e according to the fifth embodiment is similar to the first embodiment, except that the second ring 20e includes at least one retention projection 18e' on the second radially inner flange 28e that projects radially outwardly, and includes at least one retention recess 34e' on the second radially outer flange 24e. The first ring 4e includes at least one retention recess 34e" on the first radially inner flange 12e, and includes at least one retention projection 18e" on the first radially outer flange 8e that projects radially inwardly. The at least one retention projection 18e' on the second radially inner flange 28e engages with the at least one retention recess 34e" on first radially inner flange 12e. The at least one retention projection 18e" on the first radially outer flange 8e engages with the at least one retention recess 34e' on the second radially outer flange 24e. The first radially outer flange 8e encompasses the second radially outer flange 24e, and the second radially inner flange 28e encompasses the first radially inner flange 12e.

Figure 6:
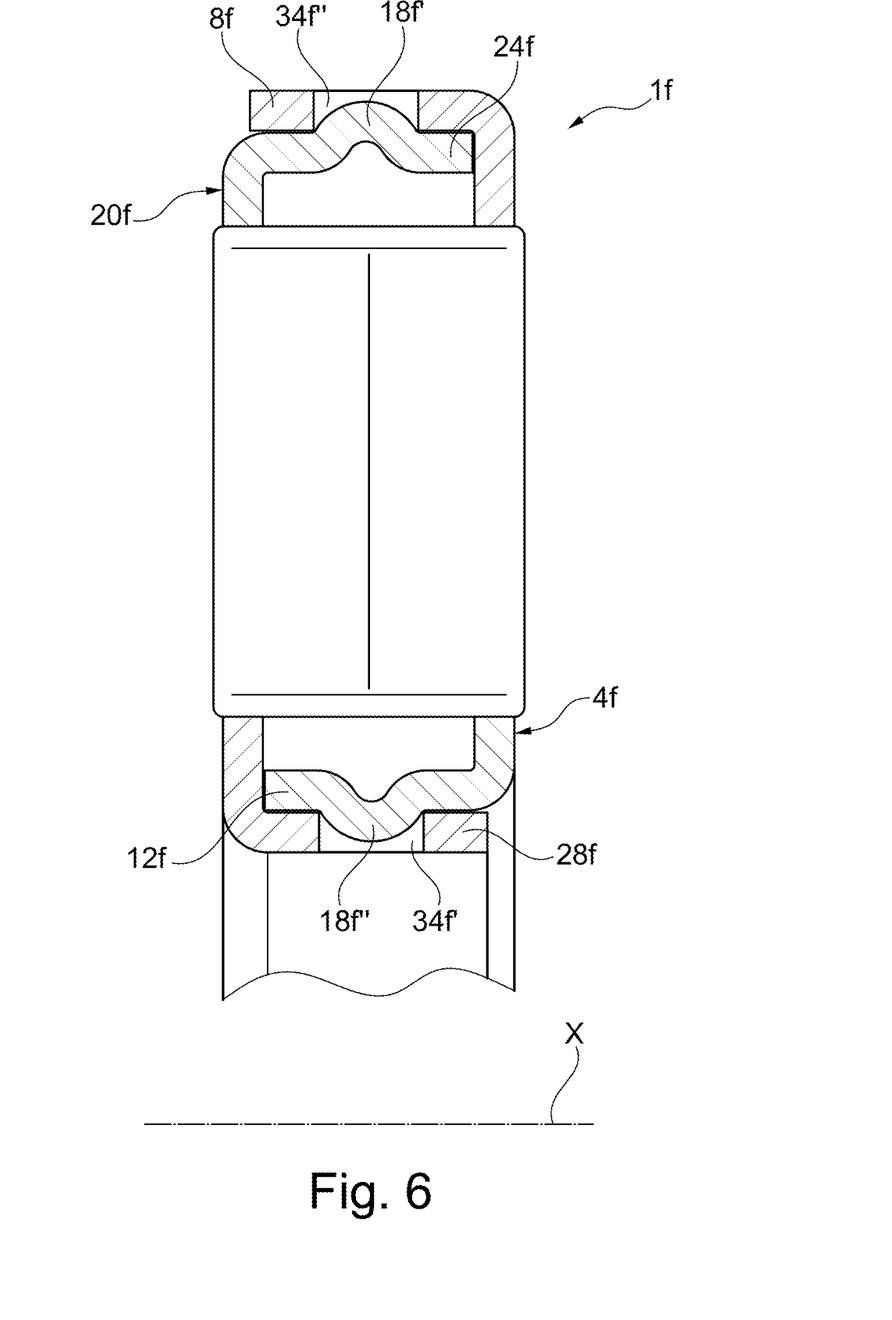
FIG. 6 is a cross-sectional view through a snap-fit box cage according to a sixth embodiment of the present invention.

Referring to FIG. 6, a sixth embodiment of a snap-fit box cage 1f according to the invention is shown. The snap-fit box cage 1f according to the sixth embodiment is similar to the first embodiment, except that the second ring 20f includes at least one retention projection 18f on the second radially outer flange 24f that projects radially outwardly, and includes at least one retention recess 34f' on the second radially inner flange 28f. The first ring 4f includes at least one retention recess 34f'' on the first radially outer flange 8f, and includes at least one retention projection 18f''' on the first radially inner flange 12f that projects radially inwardly. The at least one retention projection 18f on the second radially outer flange 24f engages with the at least one retention recess 34f'' on the first radially outer flange 8f. The at least one retention projection 18f''' on the first radially inner flange 12f engages with the at least one retention recess 34f' on the second radially inner flange 28f. The first radially outer flange 8f encompasses the second radially outer flange 24f, and the second radially inner flange 28f encompasses the first radially inner flange 12f.

Figure 7:
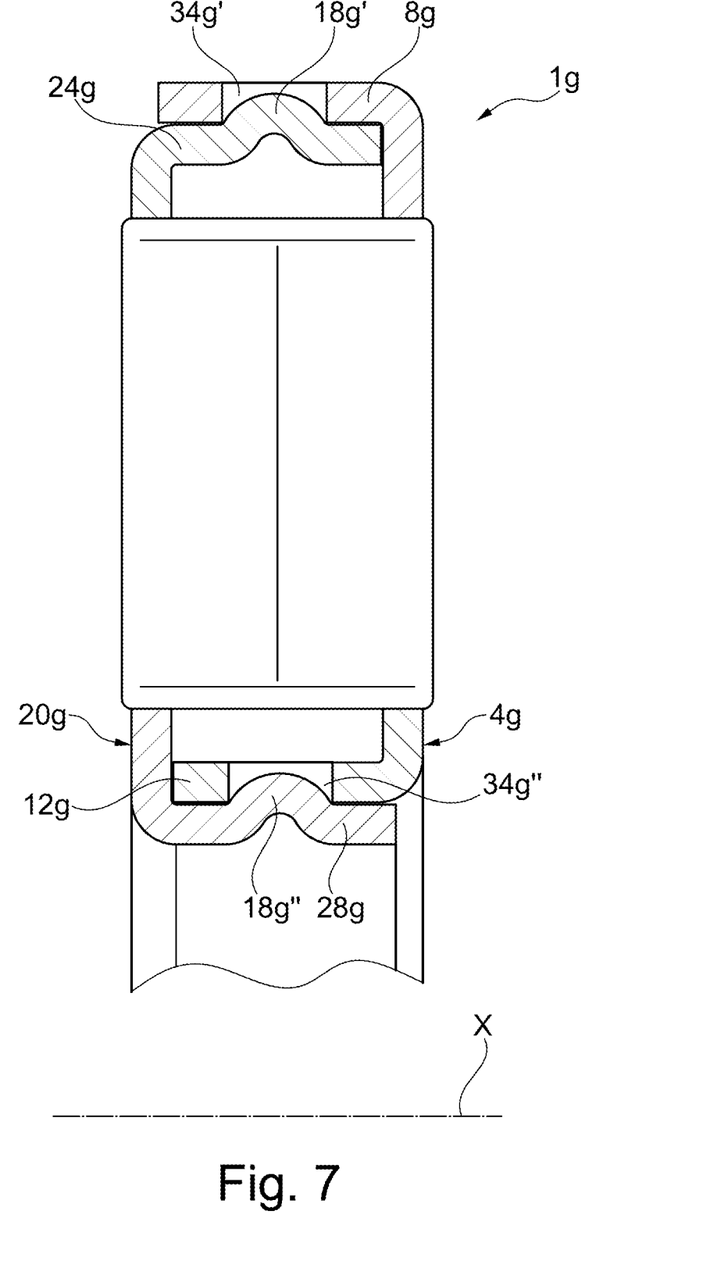
FIG. 7 is a cross-sectional view through a snap-fit box cage according to a seventh embodiment of the present invention.

Referring to FIG. 7, a seventh embodiment of a snap-fit box cage 1g according to the invention is shown. The snap-fit box cage 1g according to the seventh embodiment is similar to the first embodiment, except the first ring 4g includes at least one retention recess 34g' on the first radially outer flange 8g and at least one retention recess 34g'' on the first radially inner flange 12g. The second ring 20g includes at least one retention projection 18g' on the second radially outer flange 24g and at least one retention projection 18g'' on the second radially inner flange 28g, and both retention projections 18g', 18g'' project radially outwardly into the recesses 34g', 34g''. The first radially outer flange 8g encompasses the second radially outer flange 24g, and the second radially inner flange 28g encompasses the first radially inner flange 12g.

Figure 8:
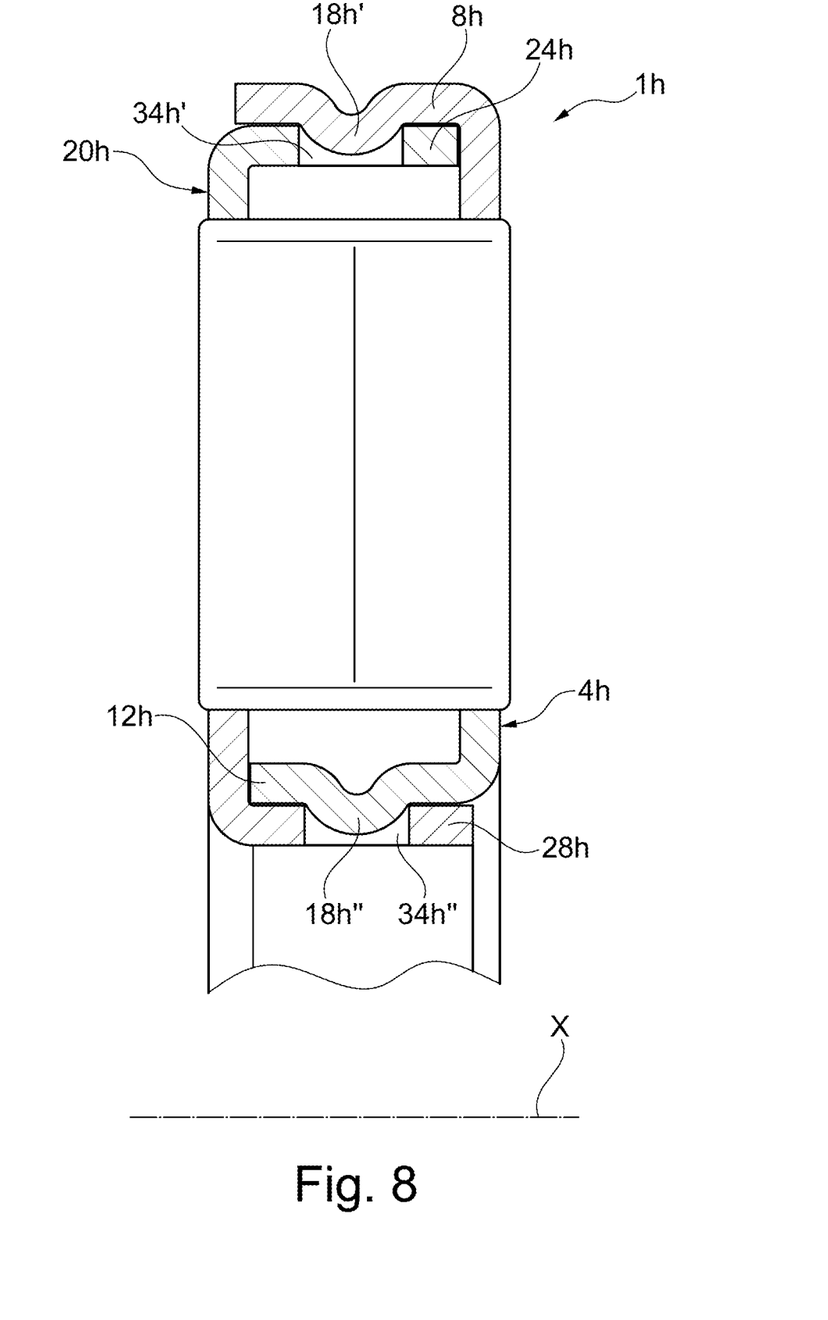
FIG. 8 is a cross-sectional view through a snap-fit box cage according to an eighth embodiment of the present invention.

Referring to FIG. 8, an eighth embodiment of a snap-fit box cage 1h according to the invention is shown. The snap-fit box cage 1h according to the eighth embodiment is similar to the first embodiment, except the first ring 4h includes at least one retention projection 18h' on the first radially outer flange 8h, at least one retention projection 18h'' on the first radially inner flange 12h, and both projections 18h', 18h'' project radially inwardly. The second ring 20h includes at least one retention recess 34h' on the second radially outer flange 24h, and at least one retention recess 34h'' on the second radially inner flange 28h. The at least one retention projection 18h' on the first radially outer flange 8h engages with the at least one retention recess 34h' on the second radially outer flange 24h, and the at least one retention projection 18h'' on the first radially inner flange 12h engages with the at least one retention recess 34h'' on the second radially inner flange 28h. The first radially outer flange 8h encompasses the second radially outer flange 24h, and the second radially inner flange 28h encompasses the first radially inner flange 12h.

Figure 9:
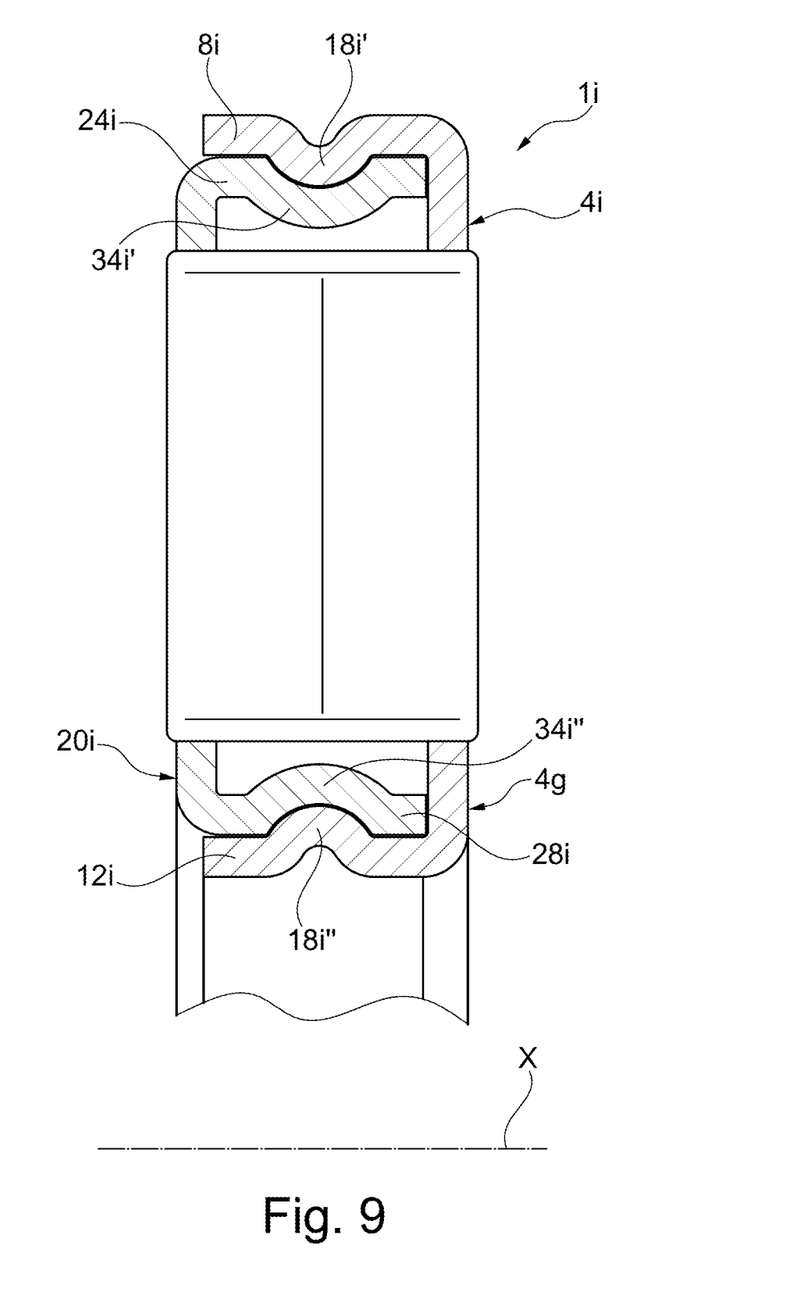
FIG. 9 is a cross-sectional view through a snap-fit box cage according to a ninth embodiment of the present invention.

Referring to FIG. 9, a ninth embodiment of a snap-fit box cage 1i according to the invention is shown. The snap-fit box cage 1i according to the ninth embodiment is similar to the first embodiment, except the configuration of the second ring 20i is different. The second ring 20i includes retention recesses 34i', 34i''' that are formed as dome-shaped indentations and are complementary to the dome-shaped retention projections 18i', 18i''' on the first ring 4i. The retention recess 34i' on the second radially outer flange 24i and the retention projection 18i' on the first radially outer flange 8i both extend radially inwardly. The retention recess 34i''' on the second radially inner flange 28i and the retention projection 18i''' on the first radially inner flange 12i both extend radially outwardly. The first radially outer flange 8i encompasses the second radially outer flange 24i, and the first radially inner flange 12i encompasses the second radially inner flange 28i.

Figure 10:
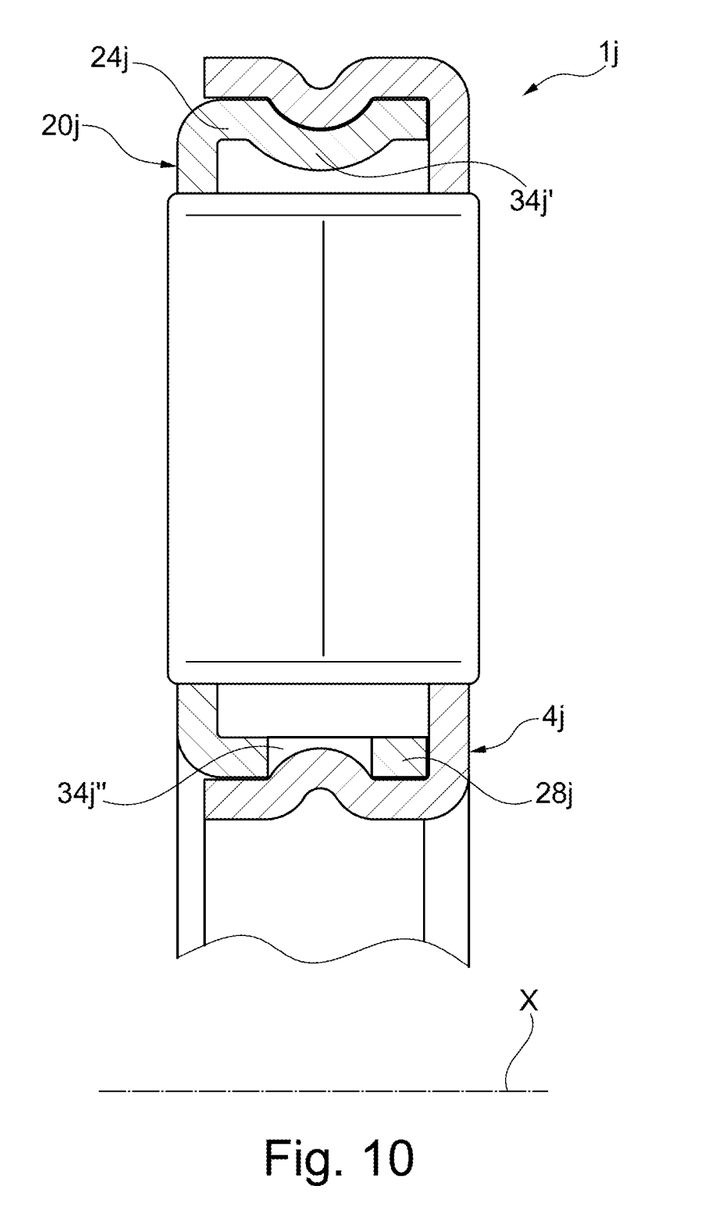
FIG. 10 is a cross-sectional view through a snap-fit box cage according to a tenth embodiment of the present invention.

Referring to FIG. 10, a tenth embodiment of a snap-fit box cage 1j according to the invention is shown. The snap-fit box cage 1j according to the tenth embodiment is similar to the ninth embodiment, except the configuration of the second ring 20j is different. The second ring 20j includes at least one retention recess 34j' on the second radially outer flange 24j that is formed as a dome-shaped indentation, and the second radially inner flange 28j includes at least one retention recess 34j''' that is formed as a circular hole. The flanges of first ring 4j encompass the flanges of the second ring 20j in this embodiment.

Figure 11A:
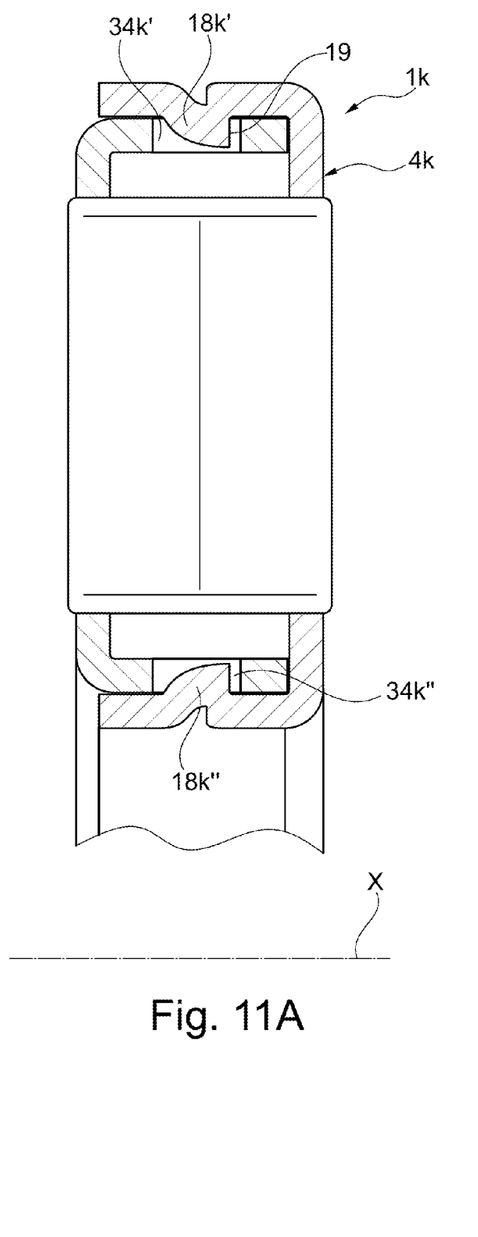
FIG. 11A a cross-sectional view through a snap-fit box cage according to an eleventh embodiment of the present invention.
Figure 11B:
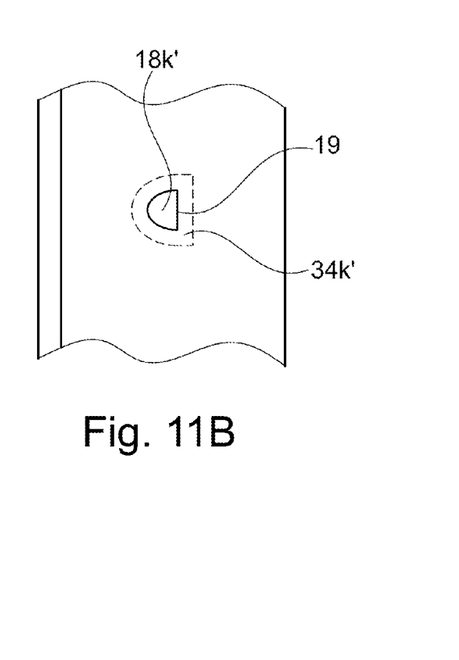
FIG. 11B is a partial top view of the snap-fit box of FIG. 11A.

Referring to FIGS. 11A and 11B, an eleventh embodiment of a snap-fit box cage 1k according to the invention is shown. The snap-fit box cage 1k according to the eleventh embodiment is similar to the first embodiment, except the retention projections 18k', 18k'' of the first ring 4k, and the retention recesses 34k', 34k'' of the second ring 20k are different. The retention projections 18k', 18k'' include a D-shaped protrusion that has a flat side surface 19. As shown more clearly in FIG. 11B, the retention recesses 34k', 34k'' have a D-shaped opening with a flat side surface and are complementary to the retention projections 18k', 18k''.

Figure 12:
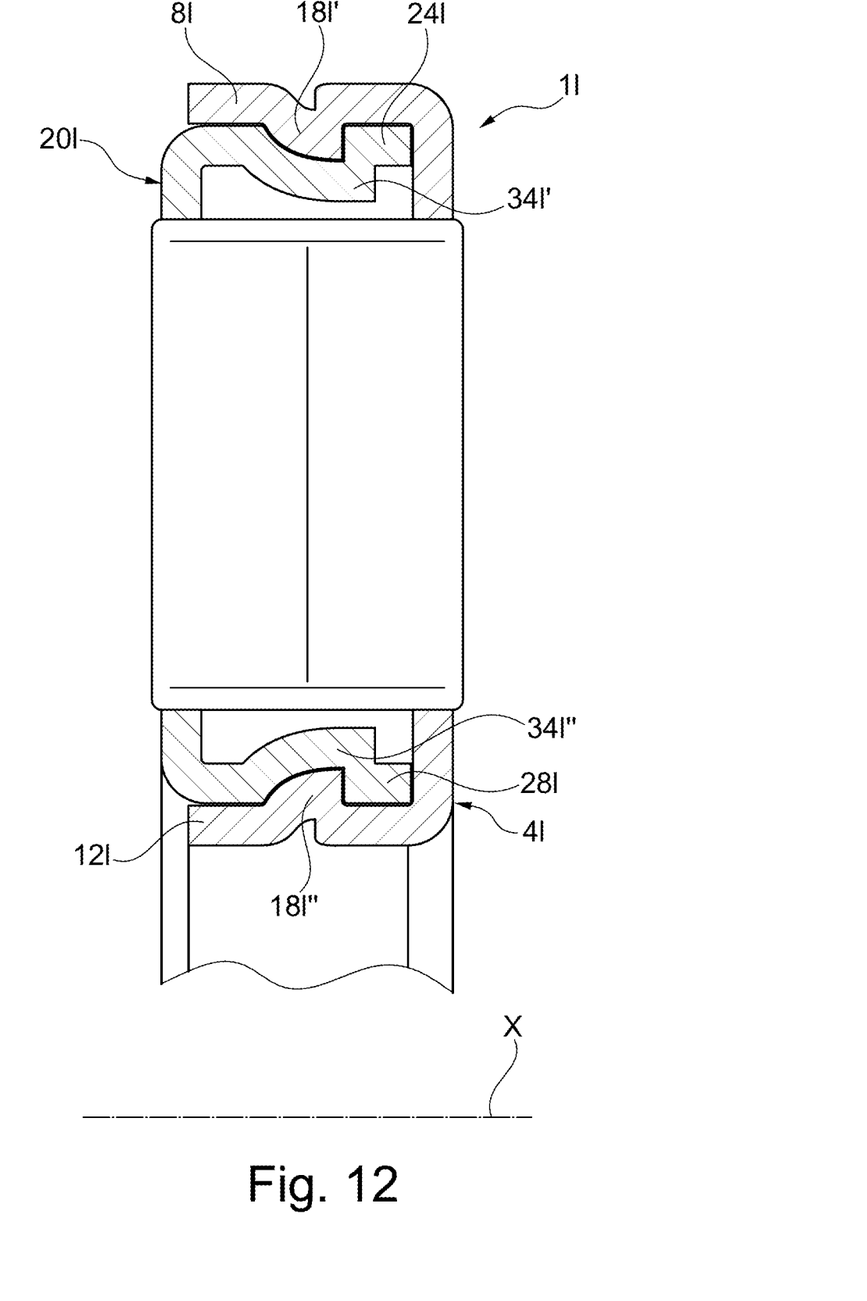
FIG. 12 is a cross-sectional view through a snap-fit box cage according to a twelfth embodiment of the present invention.

Referring to FIG. 12, a twelfth embodiment of a snap-fit box cage 1l according to the invention is shown. The snap-fit box cage 1l according to the twelfth embodiment is similar to the eleventh embodiment, except the second ring 20l includes two retention recesses 34l', 34l''' that are formed as D-shaped retention projections and are complementary to dome-shaped retention projections 18l', 18l''' on the first ring 4l. The at least one retention recess 34l' on the second radially outer flange 24l and the at least one retention projection 18l' on the first radially outer flange 8l are complementary and both extend radially inwardly. The at least one retention recess 34l''' on the second radially inner flange 28l and the at least one retention projection 18l''' on the first radially inner flange 12l are complementary and both extend radially outwardly.

Figure 13A:
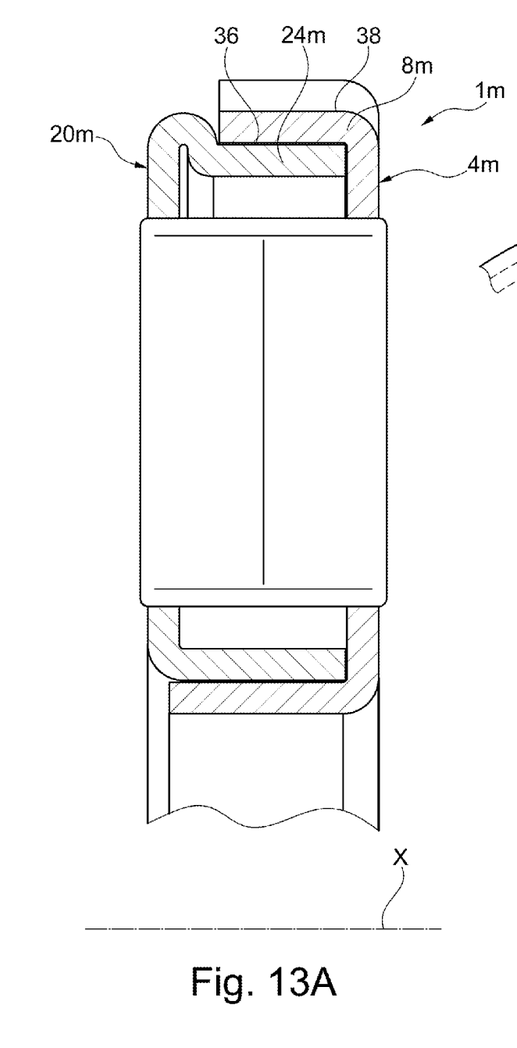
FIG. 13A is a cross-sectional view through a snap-fit box cage according to a thirteenth embodiment of the present invention.
Figure 13B:
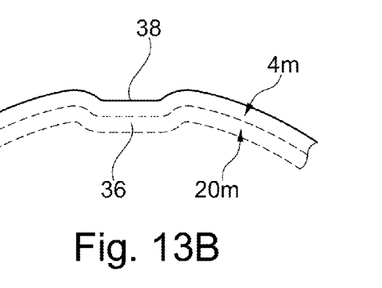
FIG. 13B is a partial view of a circumferential portion of the snap-fit box cage of FIG. 13A.
Figure 13C:
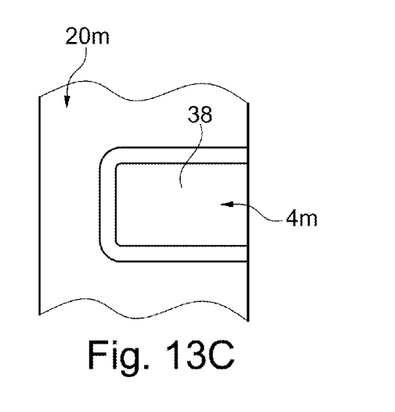
FIG. 13C is a partial top view of the snap-fit box cage of FIG. 13A.

Referring to FIGS. 13A-13C, a thirteenth embodiment of a snap-fit box cage 1m according to the invention is shown. FIG. 13A shows the snap-fit box cage 1m of the thirteenth embodiment along a portion away from any retention projections or retention recesses. The snap-fit box cage 1m is similar to the first embodiment, except the second ring 20m includes at least one depression 36 on the second radially outer flange 24m, and the first ring 4m includes at least one depression 38 on the first radially outer flange 8m that is complementary to the at least one depression 36 on the second ring 20m. These complementary depressions 36, 38 aid with the circumferential alignment of the first ring 4m and second ring 20m during assembly. Although only one depression is shown on each of the rings 4m, 20m in FIGS. 13A-13C, one of ordinary skill in the art recognizes any number of depressions can be provided on the rings 4m, 20m, and depressions can be provided on the radially inner flanges 12m, 28m of the rings 4m, 20m. The depressions 36, 38 can be formed on any of the snap-fit box cages of the other embodiments.

A method of assembling a snap-fit box cage 1 according to the present invention is also provided. The method includes providing a first ring 4 including a first radially outer flange 8, a first radially inner flange 12, and a first radial portion 16 extending therebetween. The first radial portion 16 includes a plurality of circumferentially spaced apart pockets 6. At least one of the first radially inner flange 12 or the first radially outer flange 8 includes at least one retention projection 18. The method includes providing a second ring 20 including a second radially outer flange 24, a second radially inner flange 28, and a second radial portion 32 extending therebetween. The second radial portion 32 includes a second plurality of circumferentially spaced apart pockets 22. At least one of the second radially inner flange 28 or the second radially outer flange 24 includes at least one retention recess 34 that is complementary to the at least one retention projection 18 of the first ring 4. The method includes installing rollers 2 in at least some of the pockets 6, 22 and pressing the first ring 4 and the second ring 20 together with the first radially inner flange 12 encompassing the second radially inner flange 28, the first radially outer flange 8 encompassing the second radially outer flange 24, and the at least one retention projection 18 of the first ring 4 resiliently engaging the at least one retention recess 34 of the second ring 20.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LIST OF REFERENCE NUMBERS

1. Snap-Fit Box Cage
2. Rollers
4. First Ring
6. Pockets of First Ring
8. First Radially Outer Flange of First Ring
10. Medial Portion of Radially Outer Flange of First Ring
12. First Radially Inner Flange of First Ring
14. Medial Portion of Radially Inner Flange of First Ring
16. First Radial Portion of First Ring
18. Retention Projection
19. Flat Side Surface of Projection
20. Second Ring
22. Pockets of Second Ring
24. Second Radially Outer Flange of Second Ring
26. Medial Portion of Radially Outer Flange of Second Ring
28. Second Radially Inner Flange of Second Ring
30. Medial Portion of Radially Inner Flange of Second Ring
32. Second Radial Portion of Second Ring
34. Retention Recess
36. Depression on Second Ring
38. Depression on First Ring

What is claimed is:
1. A snap-fit box cage comprising:
a first ring including a first radially outer flange, a first radially inner flange, and a first radial portion extending therebetween, the first radial portion includes a first plurality of pockets, at least one of the first radially inner flange or the first radially outer flange includes at least one retention projection;
a second ring including a second radially outer flange, a second radially inner flange, and a second radial portion extending therebetween, the second radial portion includes a second plurality of pockets, at least one of the second radially inner flange or the second radially outer flange includes at least one retention recess that is complementary to the at least one retention projection of the first ring; and
the first radially inner flange encompasses the second radially inner flange, or the first radially outer flange encompasses the second radially outer flange, wherein the first ring includes a plurality of retention projections spaced circumferentially apart from each other, and the second ring includes a plurality of retention recesses spaced circumferentially apart from each other that are complementary to the plurality of retention projections on the first ring.

2. The snap-fit box cage of claim 1, wherein the at least one retention projection of the first ring is formed as a dome-shaped projection.

3. The snap-fit box cage of claim 1, wherein the at least one retention recess of the second ring is formed as a dome-shaped indentation.

4. The snap-fit box cage of claim 1, wherein the at least one retention recess of the second ring is formed as a hole.

5. The snap-fit box cage of claim 1, wherein the at least one retention projection of the first ring is formed as a D-shaped projection and includes a flat side surface.

6. The snap-fit box cage of claim 5, wherein the at least one retention recess of the second ring is formed as a D-shaped hole or indentation that is complementary to the at least one retention projection of the first ring.

7. The snap-fit box cage of claim 1, wherein the first radially inner flange encompasses the second radially inner flange, and the first radially outer flange encompasses the second radially outer flange.

8. A snap-fit box cage-roller assembly, comprising the snap-fit box cage of claim 1, and rollers located in at least some of the first and second pluralities of pockets.

9. A snap-fit box cage comprising:
a first ring including a first radially outer flange, a first radially inner flange, and a first radial portion extending therebetween, the first radial portion includes a first plurality of pockets, at least one of the first radially inner flange or the first radially outer flange includes at least one retention projection;
a second ring including a second radially outer flange, a second radially inner flange, and a second radial portion extending therebetween, the second radial portion includes a second plurality of pockets, at least one of the second radially inner flange or the second radially outer flange includes at least one retention recess that is complementary to the at least one retention projection of the first ring; and
the first radially inner flange encompasses the second radially inner flange, or the first radially outer flange encompasses the second radially outer flange, wherein the first radially outer flange includes at least one first retention projection, the first radially inner flange includes at least one second retention projection, the second radially outer flange includes at least one first retention recess that is complementary to the at least one first retention projection of the first ring, and the second radially inner flange includes at least one second retention recess that is complementary to the at least one second retention projection of the first ring.

10. The snap-fit box cage of claim 9, wherein the at least one first retention projection of the first ring is formed on a radially inner surface of the first radially outer flange, and the at least one second retention projection of the first ring is formed on a radially outer surface of the first radially inner flange.

11. A method of assembling a snap-fit box cage and roller assembly, the method comprising:

providing a first ring including a first radially outer flange, a first radially inner flange, and a first radial portion extending therebetween, the first radial portion includes a first plurality of pockets, at least one of the first radially inner flange or the first radially outer flange includes at least one retention projection, and a second ring including a second radially outer flange, a second radially inner flange, and a second radial portion extending therebetween, the second radial portion includes a second plurality of pockets, at least one of the second radially inner flange or the second radially outer flange includes at least one retention recess that is complementary to the at least one retention projection of the first ring, the first ring includes a plurality of retention projections spaced circumferentially apart from each other, and the second ring includes a plurality of retention recesses spaced circumferentially apart from each other that are complementary to the plurality of retention projections on the first ring;

installing rollers between the first ring and the second ring in at least some of the pockets; and pressing the first ring and the second ring together with the first and second radially inner flanges engaging one another, the first and second radially outer flanges engaging one another, and the at least one retention projection of the first ring resiliently engaging with the at least one retention recess of the second ring.

* * * * *